US012682294B1

(12) United States Patent
Chung et al.

(10) Patent No.: US 12,682,294 B1
(45) **Date of Patent: *Jul. 14, 2026**

(54) SYSTEMS AND METHODS FOR PROVIDING A PREDICTIVE ITINERARY

(71) Applicant: U.S. Bank National Association, Minneapolis, MN (US)

(72) Inventors: Duke Chung, San Francisco, CA (US); Joseph Bradley Reid Williams, San Mateo, CA (US); Angelina Yooyoung Kim, Oakland, CA (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,508

(22) Filed: Jan. 27, 2025

Related U.S. Application Data

(63) Continuation of application No. 18/411,627, filed on Jan. 12, 2024, now Pat. No. 12,236,372, which is a continuation of application No. 17/031,267, filed on Sep. 24, 2020, now Pat. No. 11,928,615.

(60) Provisional application No. 62/905,569, filed on Sep. 25, 2019.

(51) Int. Cl.
*G06Q 10/02* (2012.01)
*G06Q 30/0251* (2023.01)
*G06Q 50/10* (2012.01)

(52) U.S. Cl.
CPC ....... *G06Q 10/025* (2013.01); *G06Q 30/0255* (2013.01); *G06Q 30/0271* (2013.01); *G06Q 50/10* (2013.01)

(58) Field of Classification Search
CPC ........ G06Q 50/14; H04L 67/52; A01K 11/008
See application file for complete search history.

(56) References Cited

U.S. PATENT DOCUMENTS

| | | | |
|---|---|---|---|
| 7,911,344 B2 * | 3/2011 | August | ............... A01K 11/008 |
| | | | 340/572.1 |
| 8,762,185 B2 | 6/2014 | Shaw et al. | |
| 9,704,110 B2 | 7/2017 | Shaw et al. | |
| 10,417,584 B2 | 9/2019 | Jaffe | |
| 11,928,615 B1 | 3/2024 | Chung et al. | |
| 12,236,372 B1 | 2/2025 | Chung | |
| 2006/0106655 A1 | 5/2006 | Lettovsky et al. | |
| 2007/0185744 A1 * | 8/2007 | Robertson | .............. G06Q 50/14 |
| | | | 705/5 |
| 2008/0046298 A1 | 2/2008 | Ben-Yehuda et al. | |
| 2010/0190510 A1 | 7/2010 | Maranhas et al. | |
| 2011/0225257 A1 * | 9/2011 | Tilden | .................... G06Q 50/14 |
| | | | 709/207 |
| 2013/0254034 A1 | 9/2013 | Maranhas et al. | |

(Continued)

FOREIGN PATENT DOCUMENTS

NZ            749802 A        9/2019

*Primary Examiner* — Saba Dagnew
(74) *Attorney, Agent, or Firm* — Merchant & Gould P.C.

(57) ABSTRACT

Embodiments of the present disclosure generally relate to a network-based real-time enterprise travel management system that can facilitate planning, booking, scheduling, and managing travel, while also facilitating expense budgeting and reporting. Embodiments of the present disclosure can provide systems and methods for generating and managing a predictive itinerary associated with travel and/or an event, as well as a centralized marketplace for accessing various services and events.

20 Claims, 10 Drawing Sheets

(56)　　　　　　　References Cited

U.S. PATENT DOCUMENTS

| | | |
|---|---|---|
| 2013/0339341 A1 | 12/2013 | Fan et al. |
| 2014/0372867 A1 | 12/2014 | Tidhar et al. |
| 2015/0176997 A1 | 6/2015 | Pursche et al. |
| 2015/0363694 A1 | 12/2015 | Banjeree et al. |
| 2016/0170998 A1 | 6/2016 | Frank |
| 2017/0046637 A1 | 2/2017 | Jaygarl et al. |
| 2017/0228667 A1 | 8/2017 | Duschl |
| 2017/0353411 A1* | 12/2017 | Zhong ..................... H04L 67/52 |
| 2018/0075391 A1 | 3/2018 | Chung et al. |
| 2018/0293522 A1 | 10/2018 | Shaw et al. |

* cited by examiner

100

102

102

104

102

NETWORK
106

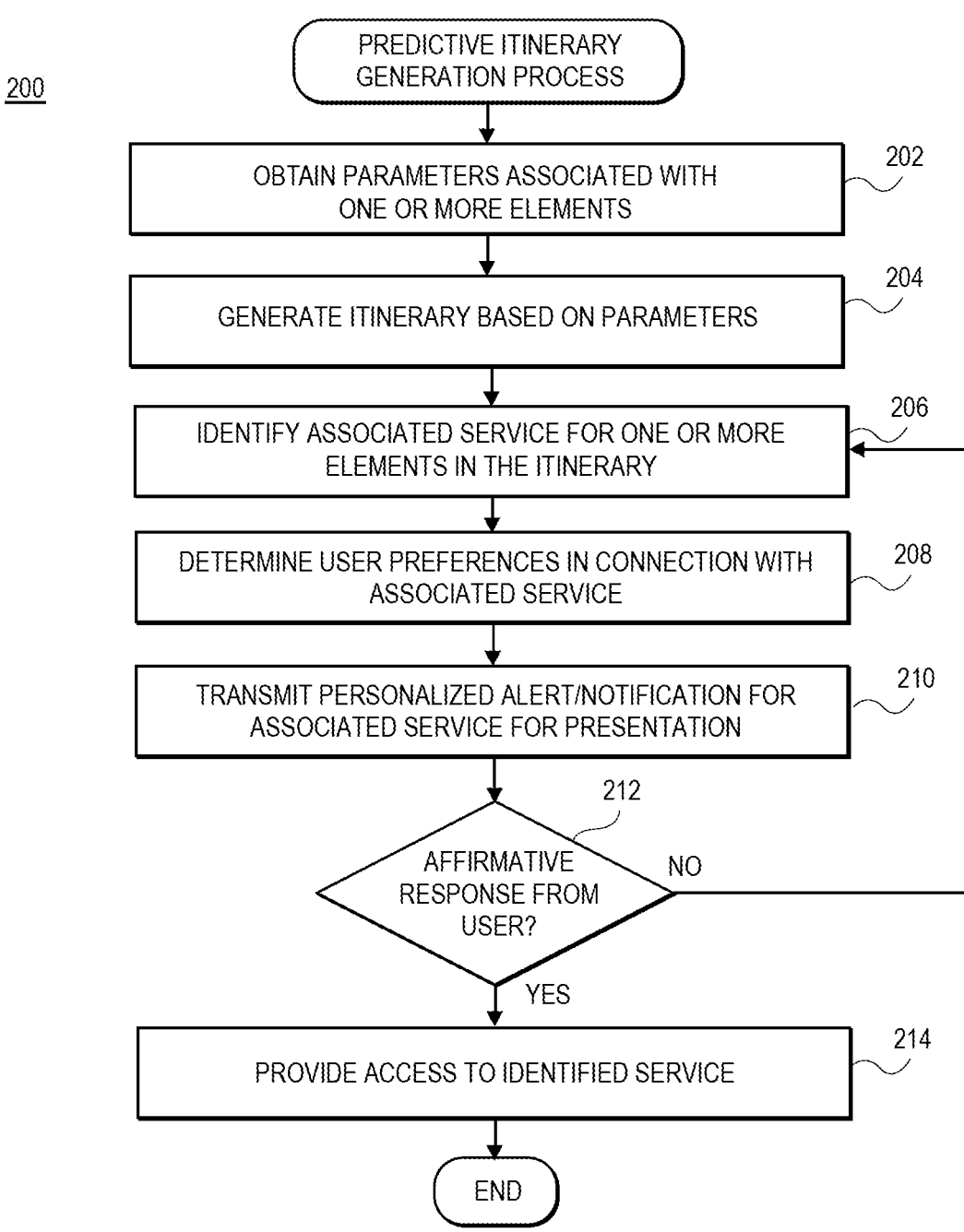

200

PREDICTIVE ITINERARY
GENERATION PROCESS

OBTAIN PARAMETERS ASSOCIATED WITH
ONE OR MORE ELEMENTS          202

GENERATE ITINERARY BASED ON PARAMETERS          204

IDENTIFY ASSOCIATED SERVICE FOR ONE OR MORE
ELEMENTS IN THE ITINERARY          206

DETERMINE USER PREFERENCES IN CONNECTION WITH
ASSOCIATED SERVICE          208

TRANSMIT PERSONALIZED ALERT/NOTIFICATION FOR
ASSOCIATED SERVICE FOR PRESENTATION          210

AFFIRMATIVE
RESPONSE FROM
USER?          212          NO

YES

PROVIDE ACCESS TO IDENTIFIED SERVICE          214

END

Figure 3A:
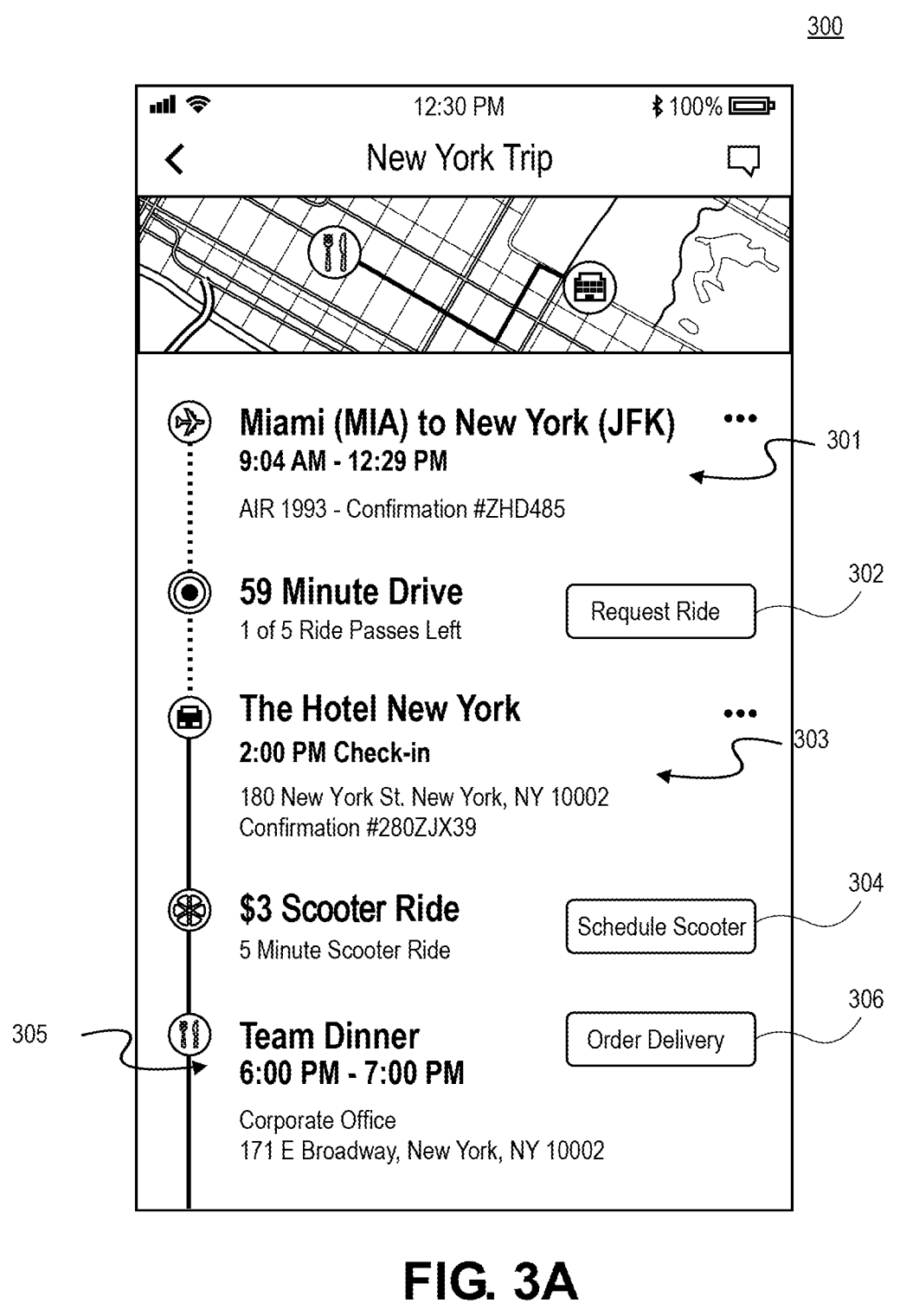

Miami (MIA) to New York (JFK)
9:04 AM - 12:29 PM

AIR 1993 - Confirmation #ZHD485

301

59 Minute Drive
1 of 5 Ride Passes Left

Request Ride

302

The Hotel New York
2:00 PM Check-in

180 New York St. New York, NY 10002
Confirmation #280ZJX39

303

$3 Scooter Ride
5 Minute Scooter Ride

Schedule Scooter

304

Team Dinner
6:00 PM - 7:00 PM

Corporate Office
171 E Broadway, New York, NY 10002

Order Delivery

Figure 3C:
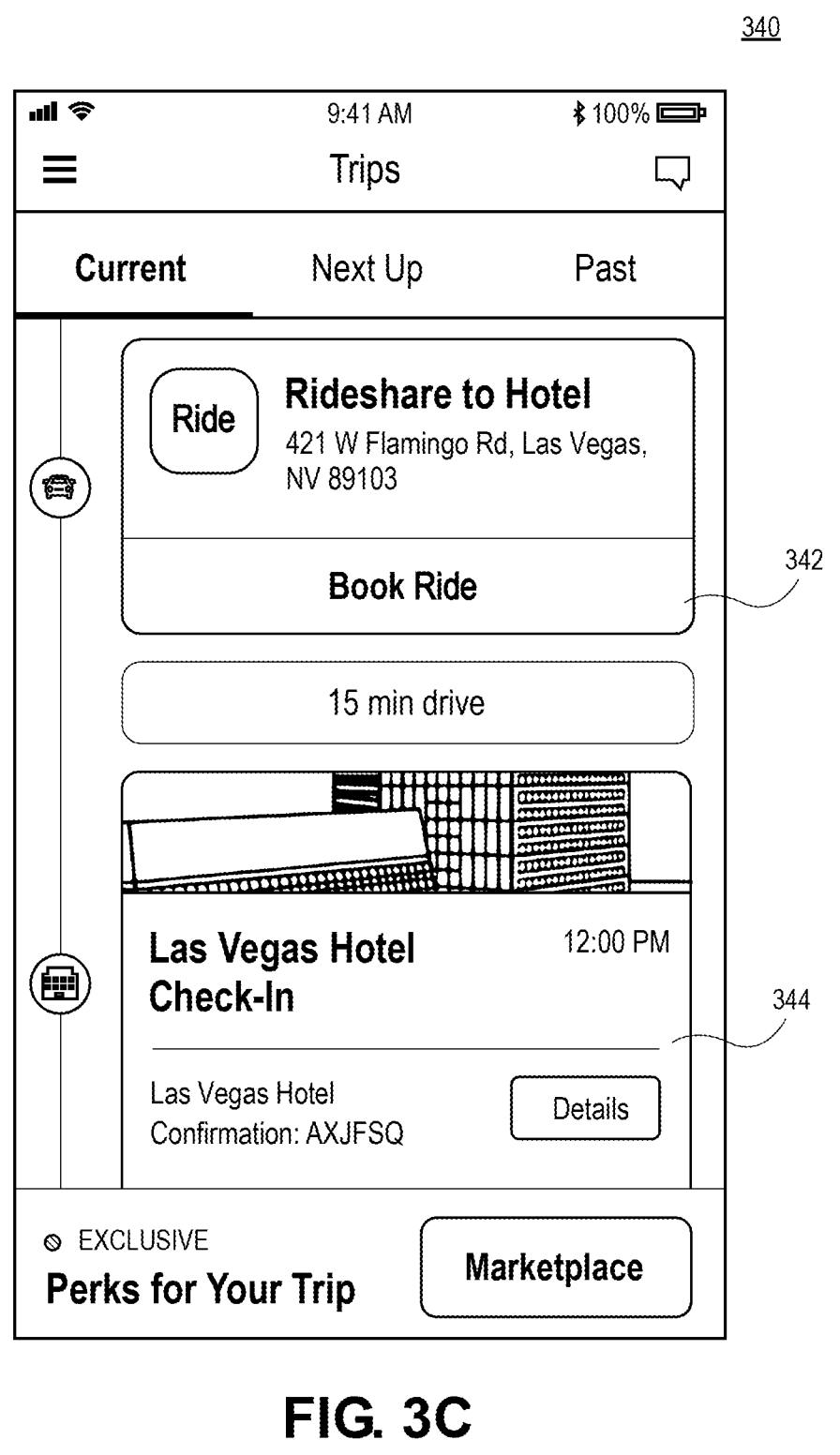

Trips

Current          Next Up          Past

Ride   Rideshare to Hotel
421 W Flamingo Rd, Las Vegas,
NV 89103

Book Ride                                    342

15 min drive

Las Vegas Hotel                 12:00 PM
Check-In
                                                 344
Las Vegas Hotel                    [ Details ]
Confirmation: AXJFSQ ⊘ EXCLUSIVE
Perks for Your Trip          [ Marketplace ]

SYSTEMS AND METHODS FOR PROVIDING A PREDICTIVE ITINERARY

CROSS-REFERENCE TO PRIOR APPLICATIONS

This application claims priority to and is a Continuation of U.S. patent application Ser. No. 18/411,627, filed Jan. 12, 2024, which is a Continuation of U.S. patent application Ser. No. 17/031,267, filed on Sep. 24, 2020, now U.S. Pat. No. 11,928,615, issued Mar. 12, 2024, which claims the benefit of U.S. Provisional Patent Application No. 62/905,569, filed Sep. 25, 2019, which applications are hereby incorporated herein by reference in their entireties.

BACKGROUND

Business travel can be both necessary and enjoyable. However, business travel can be difficult to plan, book, and manage. Further, the schedules and/or itineraries of business travelers are typically packed, with limited free time, often in order to maximize time spent at a destination. Consequently, although business travelers increasingly look to mix at least some leisure into their business travel, it can be difficult in view of tight schedules and limited free time to search and reserve attractions and events in unfamiliar cities and locations.

BRIEF DESCRIPTION OF THE DRAWINGS

FIG. 2 is a flow diagram of an exemplary process for generating a predictive itinerary, in accordance with embodiments of the present disclosure.

FIGS. 3A-3F are illustrations of presentations of exemplary screenshots, in accordance with embodiments of the present disclosure.

Figure 1:
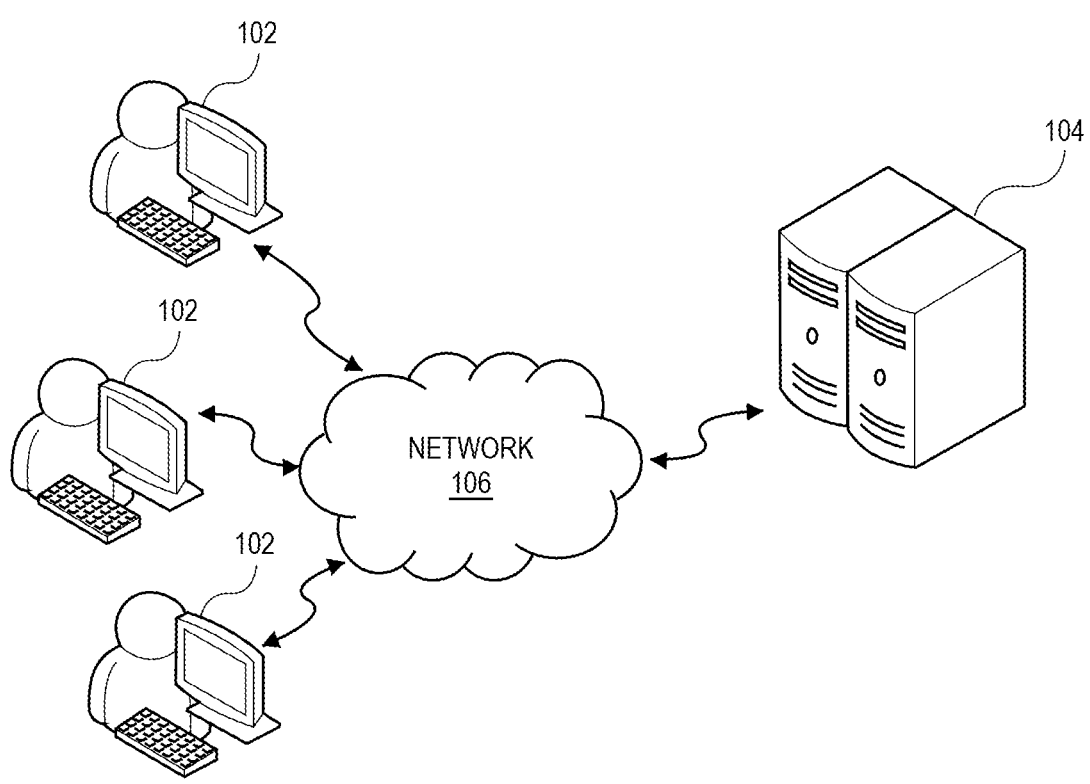
FIG. 1 is a block diagram illustrating an exemplary computing system, in accordance with embodiments of the present disclosure.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments of the present disclosure generally relate to a network-based real-time enterprise travel management system that can facilitate planning, booking, scheduling, and managing travel, while also facilitating expense budgeting and reporting. Embodiments of the present disclosure can provide systems and methods for generating and managing a predictive itinerary associated with travel and/or an event, as well as a centralized marketplace for accessing various services and events. For example, data and/or information in connection with certain parameters associated with an event and/or travel can first be obtained. The data and/or information can include transportation information (e.g., flight information, train information, car rental information, bus information, etc.), lodging information (e.g., hotel information, etc.), meal reservations (e.g., restaurant, location, and times, etc.), meeting information (e.g., location and times, etc.), social events (e.g., receptions, cocktails, etc.), etc. This data and/or information can be compiled and aggregated to construct an itinerary detailing the various elements that make up the trip and/or event (e.g., transportation, lodging, meetings, free time, social events, meals, speaking engagements, conferences, etc.).

After the itinerary has be constructed, embodiments of the present disclosure can provide predictive alerts, notifications, automated bookings, etc. for services based on the constructed itinerary, the user's preferences, the user's profile, the user's past behavior, tendencies, etc. For example, based on the constructed master itinerary, for one or more elements in the itinerary (e.g., a flight, a restaurant reservation, etc.), a predicted or suggested associated service can be identified, and the user's preferences in connection with the predicted associated service can also be identified. For example, in connection with an upcoming flight, it may be determined the amount of time before a flight the user typically arrives at the airport, the preferred mode of transportation to the airport, the typical service provider of the mode of transportation, etc., and an alert and/or notification may be presented to the user in connection with the predicted or suggested transportation to the airport. For example, a notification may be presented asking the user whether he/she would like to proceed with the predicted or suggested service. Alternatively and/or in addition, the alert or notification may indicate that the predicted or suggested service was automatically engaged (e.g., the automated processing of the predicted or suggested service may be activated in the user's profile and/or preferences, etc.).

According to certain exemplary embodiments, the alerts and/or notifications provided to the user for services and/or experiences can be centralized in a marketplace. For example, embodiments of the present disclosure can also provide a marketplace where all of the suggested or predicted services and/or experiences provided to the user in an alert or notification can be accessed via a marketplace in the application, so that the information can be provided to the user. For example, in the example where a user responds in the affirmative to an alert or notification provided regarding requesting a ride share as transportation to the airport, the ride share application may be accessed in the marketplace.

Although embodiments of the present disclosure are described with respect to enterprise travel, the systems and methods described herein are not limited thereto, and can be applicable to the scheduling and/or management of any travel, event, itinerary, etc. Further, exemplary embodiments of the present disclosure can provide systems and methods that can construct and manage a predictive itinerary associated with a user in connection with a trip that was budgeted and booked in accordance with the systems and methods described in U.S. application Ser. No. 15/691,662, filed on Aug. 30, 2017, which is hereby incorporated by reference herein in its entirety.

FIG. 1 shows an exemplary system 100 according to an embodiment of the present disclosure. As shown in FIG. 1, exemplary system 100 can include one or more client devices 102 (e.g., smartphones, tablets, laptops, personal computers, etc.) communicating over a connected network 106 (e.g., wireless or wired) to one or more databases 104 (e.g., server, other computing system, etc.). Each client device 102 can include a computing device such as a mobile device, tablet, personal computer, personal data assistant, etc., which can execute an application (e.g., an app or a web-based application) that can process and enable data transmission and communication over network 106 between client devices 102 and at least one database 104. The application executed on client device 102 can also provide a graphical user interface, through which a user can interact with the application on client device 102. For example, the application can facilitate the construction/generation of the exemplary predictive itineraries, as well as the provisioning of the suggested or predicted services based on the elements in the itinerary. Accordingly, certain aspects of the present disclosure can provide exemplary systems and methods that can facilitate, for example, planning, booking, and managing travel and events, including the management of travel schedules and/or itineraries for users.

Embodiments of the present disclosure can be implemented, for example, via a mobile or web-based application on any client device 102. For example, a user can access the schedule and/or itinerary on an application on client device 102. The itinerary can be stored locally or remotely and be accessed via network 106. Further, the parameters and information used to construct the itinerary can be accessed locally on client device 102 or be received via network 106 from remote computing devices and databases (e.g., via APIs of airlines, email clients, hotel, etc.). Once the itinerary has been constructed, the exemplary system can incorporate machine learning based, at least in part, on the user's profile, past travel itineraries, past behavior, financial transactions, geolocation, interests, etc. to generate predicted or suggested services.

According to certain exemplary embodiments, the data can be processed to construct and determine predictive alerts and/or notifications, which can be provided to client device 102. The exemplary system can also incorporate and consider any corporate travel policies and requirements established by the organization (e.g., class of travel, cost of meals, class of accommodations, etc.). For example, filters can be automatically applied to eliminate options that are out of policy (e.g., eliminating transportation and restaurant options, etc.).

FIG. 2 shows an exemplary flow diagram of an exemplary method 200 according to embodiments of the present disclosure. As described herein, exemplary method 200 may be performed by a mobile or web-based application to provide a predictive itinerary that may provide predictive and/or suggested services based on a constructed itinerary. Further, the predicted/suggested services may be accessed via a centralized marketplace, which may also be provided by the mobile or web-based application.

As shown in FIG. 2, in step 202, parameters associated with one or more elements making up an itinerary can be obtained received. This can include, for example, parameters relating to elements such as transportation information (e.g., flight information, train information, car rental information, bus information, confirmation numbers, departure/arrival times, etc.), lodging information (e.g., hotel information, confirmation numbers, check-in/check-out times, etc.), meal reservations (e.g., restaurant, location, times, confirmation numbers, etc.), meeting information (e.g., location and times, confirmation numbers, etc.), social events (e.g., receptions, cocktail hours, etc.), speaking engagements, free time, networking events, conferences, etc. For example, the systems and methods provided by embodiments of the present disclosure can obtain various information detailing a trip or event to construct a schedule and/or itinerary associated with the trip or event. According to one aspect of the present disclosure, an application (e.g., for execution on a client device) can be provided to facilitate budgeting, booking, and management of a trip and/or event on one unified platform. In connection with management of an itinerary, information relating to various bookings, reservations, events, meetings, items, etc. that may be associated with the trip or event can be obtained. According to exemplary embodiments, this information can include transportation information (e.g., flight information, train information, car rental information, bus information, etc.), lodging information (e.g., hotel information, etc.), meal reservations (e.g., restaurant, location, and times, etc.), meeting information (e.g., location and times, etc.), social events (e.g., receptions, cocktails, etc.), etc. In embodiments where the travel or event was booked directly through the application, this information can be retrieved directly from the application.

Alternatively, the information can be obtained from other applications and sources. For example, the information can be received from an email client (e.g., Outlook, Gmail, etc.), a calendar application (e.g., Outlook, Google, iOS, etc.), an application associated with the service provider (e.g., an airline application-Delta Airlines, United Airlines, etc.—a hotel application-Marriott, Hilton, IHG, Hyatt, etc.—restaurant reservation application-Resy, OpenTable, etc.), or any other source or any combination thereof. This information can be obtained through application programming interfaces (API), which can facilitate obtaining information from third-party services. Accordingly, after this information has been obtained, the information can be combined to construct a master schedule/itinerary, which can include all the compiled information for the trip or event.

For example, in a simple exemplary trip from Miami to New York, which may include a flight from MIA airport to JFK airport, a hotel reservation in New York, various scheduled meetings, various meal reservations, etc. Accordingly, in step 204, the exemplary systems and methods of the present disclosure can obtain the flight information, the hotel information, the meeting information, the meal information, etc. from various sources and can construct a master itinerary based on this information. This information can be received, for example, from the client's emails or calendars, which may include confirmations of the bookings, reservations, etc., third-party applications, etc., or any combination thereof. The flight information can include flight times (e.g., departure and arrival), airline information, confirmation number, flight number, terminal information, etc. Further, the application can monitor the status of any flights, receive any information concerning changes to the flight (e.g., delays, gate changes, cancellations, etc.) and provide alerts/notifications to the user, as well as update the flight information, as necessary. Similarly, the hotel information can include the address of the hotel, check-in and check-out times, dates of the stay, etc. Meeting information and meal information can similarly include the times of the meetings and meals, address of the location of the meetings and meals, other attendees of the meetings and meals, etc.

In step 204, an itinerary can be constructed/generated based on the parameters received in step 202. For example, the parameters obtained in step 202 can be utilized to generate an itinerary in connection with a trip or event. The elements populating the itinerary can be utilized to identify associated services and generate predictive alerts and notifications, as described herein.

In step 206, one or more associated services can be identified for one or more of the elements that make up the itinerary. For example, in an implementation where an itinerary includes a flight as an element, transportation to the airport may be identified as an associated service to the element. Similarly, in implementations where an element may include a restaurant reservation, an associated service may include transportation to the restaurant. Alternatively and/or in addition, in an implementation where a block of free time is identified as an element, an associated service may include, for example, temporary working space, a tourist excursion, etc.

Returning to the exemplary trip from Miami to New York, embodiments of the present disclosure can determine that transportation (e.g., ride share, bike/scooter share, mass transit, helicopter transfer, car or limousine service, taxi service, etc.) from the user's location to MIA airport may be such an associated service. Further, once at the airport, embodiments of the present disclosure can determine offers and/or services at the airport as predicted or suggested services. For example, vendors, shops, restaurants, lounges, stores, etc. can be identified and determined as predicted or suggested services. Similarly. such services may also be identified upon arrival at JFK. For example, services at the airport (e.g., baggage services, vendors, shops, restaurants, lounges, stores, etc.), transportation from the airport to the hotel, etc. may be associated services that may be identified in connection with arrival at JFK in New York.

According to certain aspects of the present disclosure, other offers and services can also be identified. For example, if it is identified that a meeting may require catering, refreshments, food, etc., can be identified as a predicted or suggested service in connection with the meeting. According to yet another aspect, omissions in an itinerary may also be an element for which associated services can be identified. For example, if it is identified that the itinerary is missing a hotel reservation, lodging may be identified as a service in which the user may be interested. Similarly, if an open block of time is identified in the itinerary, reserving time at a shared workspace (e.g., WeWork, etc.), visiting an attraction, or attending an event or experience may be identified as associated services. Additionally, wireless services (e.g., if a user is traveling internationally and prefers not to roam), in-flight WIFI (e.g., GoGo, etc.), services or experiences local to the destination of which the user may be unaware, etc. may all be associated services that may be identified.

Similarly, if the flight information indicates that the flight includes a layover, embodiments of the present disclosure can identify services in connection with the layover airport. For example, a map and/or a walkthrough or other assistance in navigating the layover airport can identified as a service. Additionally, vendors, shops, restaurants, lounges, stores, etc. can be identified and determined as predicted or suggested services. For example, services at the airport (e.g., baggage services, vendors, shops, restaurants, lounges, stores, etc.), transportation from the airport to the hotel, etc. may be associated services that may be identified in connection with the layover airport.

Further, the associated services that may be determined may be based on the user's preferences, the user's profile, the user's historical behavior (e.g., which service type the user typically employs, the service provider the user typically utilizes, a type of cuisine, a type of attraction/event, a lodging type, a lodging provider, a restaurant, etc.), etc. Accordingly, as in step 208, the user's preferences, historical tendencies, etc. may be determined, and based on the constructed itinerary, for one or more elements in the itinerary (e.g., a flight, a restaurant reservation, etc.) for which an associated service may have been determined (e.g., in step 206), an alert or notification may be customized and personalized to the user's preferences and tendencies, and the customized and personalized alert may be presented to the user, as in step 210. The alert can include any visual (e.g., pop-up, banner, button, etc.), haptic (e.g., vibration, etc.), audible (e.g., ring, etc.) alert or notification.

According to certain aspects of the present disclosure, the user's preferences and historical tendencies can be determined through identification of the user. For example, to access and execute the exemplary application, a user may be identified (e.g., based on cookies, user login credentials, etc.), which preferably includes a user profile associated with the user that can include various user preferences. The user preferences can include preferences that the user has selected and can also include preferences that have been learned from the user's past behavior. For example, embodiments of the present disclosure can obtain a user's usage of various services (e.g., ride share, shared working space, lounge memberships, restaurant preferences, hotel preferences, airline preferences, etc.) through financial transactions (e.g., credit card information), travel bookings, loyalty programs, etc., and process the data and information (e.g., machine learning, etc.) to identify preferences and tendencies of the user. For example, in connection with an upcoming flight, it may be determined the amount of time before a flight the user typically arrives at the airport, the preferred mode of transportation to the airport, the typical service provider of the mode of transportation, etc., and the alert or notification provided to the user may be customized based on this information.

Returning to the exemplary trip from Miami to New York, if airport transportation is identified as a predicted or suggested associated service, an alert or notification may be provided to the user suggesting certain airport transportation in view of the user's preferences and past behavior. According to certain aspect, this alert and/or notification can be provided to the user in real-time at a specific time in the midst of the itinerary at a time based on the amount of time before a flight the user typically arrives at the airport, the mode of transportation the user typically utilizes in traveling to the airport, as well as current transit times based on the mode of transportation and current conditions (e.g., traffic, mass transit service disruptions, etc.). Alternatively, the alert or notification can be generated at the time the itinerary is generated and integrated into the itinerary at the time the itinerary is constructed, allowing the alert or notification to be pre-populated in the itinerary such that user may access the service at any time. Accordingly, the alert and/or notification for transportation can be based, at least in part, on a user's location, past preferences, profile, transit times, traffic conditions, remaining budget for the trip, etc. For example, if the user has used primarily ride-sharing applications in the past, a prompt may be provided querying whether the user would like to request a ride-share (e.g., Uber, Lyft, Via, Juno, etc.) to be requested, and the user's preferred ride-sharing application provider. Alternatively, if the user has used primarily mass-transit to travel to the airport in the past, mass-transit schedules (e.g., trains, bus, subway, etc.) can be provided to the user. In another exemplary implementation, even if the user has primarily used ride-sharing applications in the past, but the remaining budget for the trip can only accommodate mass-transit options, mass-transit schedules (e.g., trains, bus, subway, etc.) can be provided to the user. In yet another exemplary situation, even if the user has primarily used mass-transit in the past, but the time remaining until departure is insufficient for mass-transit, an alert and/or notification to reserve a mode of transportation that will ensure the user to arrive at the airport in sufficient time for the flight may be provided.

Additionally, the time before departure at which the alert and/or notification for transportation and/or the automated request for transportation may be provided may be based on user preferences, the user's profile, past tendencies, traffic conditions, trip duration estimates (e.g., provided by the ride-sharing application or by a navigating application such as Google Maps, Waze, etc.) etc. According to certain embodiments, the alert and/or notification for airport transportation may be provided in sufficient time for the user to travel to the airport based on trip duration estimates based on current traffic, etc. Alternatively, using geolocation services provided by a mobile device, embodiments of the present disclosure can determine how far in advance the user typically departs for the airport in advance of a flight. Alternatively, the alert or notification can be integrated into the itinerary at the time the itinerary is constructed, allowing the user to access the service at any time. Accordingly, the prompt for transportation to the airport can be customized based on such information. Additionally, the progress of the user can be monitored as the user is travelling to the airport, and appropriate actions may be taken as necessary. For example, if the user encounters unexpected traffic and it appears that the user may miss his/her flight, an alert or notification can be provided to the user that he/she is likely to miss the flight. Consequently, a prompt may be provided asking whether the user would like to be re-booked on a later flight, airline, etc. Based on the received response, the airline application can automatically be launched with alternative flight options and/or a call to the airline can be automatically initiated.

Alerts, notifications, or offers presented at an airport can also be based on the user's profile, preferences, past behavior, location, etc. For example, if the user has a lounge membership (e.g., Priority Pass, American Express, Centurion Lounges, Delta SkyClub, United Club, American Airlines Admiral's Club, etc.), the alert may include information regarding the closest participating lounge. In the situation where the user does not have a lounge membership, an offer for a trial membership or a one-time use pass may be presented. Similarly, offers for expedited security clearance programs such as CLEAR may be provided, based on whether the user may or may not have a CLEAR membership.

Continuing the exemplary trip, an alert and/or notification for airport transportation can be provided upon receipt from the airline that the flight has landed at JFK. Accordingly, even in situations where the flight is early or delayed, the provided alert and/or notification for airport transportation will be timely since it can be based on flight information provided by the airline. Optionally, according to certain embodiments, the transportation from the airport to the hotel can further be customized at least based on, for example, a user's profile and/or preferences. For example, if, based on past trips and tendencies, the user typically makes a stop for coffee or groceries before checking-in to a hotel, an alert or prompt can be provided suggesting coffee shops or groceries on the route to the hotel.

After the alert and/or notification for a predicted or suggested service has been presented, a response may be received from the user, which can prompt a further action, as in step 212. For example, if the user responds in the affirmative that he/she would like to request a ride share to the airport, a ride-sharing application can be launched, with the destination information pre-populated, for the user to complete the reservation. According to certain embodiments, instead of providing an alert and/or notification for transportation, transportation to MIA can automatically be reserved for the user. For example, at three hours before the departure time, embodiments of the present disclosure can automatically request transportation using a ride-sharing application from the user's location to the airport and provide a notification to the user that transportation has been requested. Additionally, a prompt can be provided to the user whether the request should be cancelled or any modifications to the reservation should be made.

After the alert and/or notification for transportation has been provided, a response may be received from the user, which can prompt a further action. For example, if the user responds in the affirmative that he/she would like to request a ride share to the airport, a ride-sharing application can be launched, with the destination information pre-populated, for the user to complete the reservation. According to certain embodiments, instead of providing an alert or notification for transportation, transportation to the hotel can automatically be reserved for the user. Additionally, a prompt can be provided to the user whether the request should be cancelled or any modifications to the reservation should be made.

According to certain exemplary embodiments, the alerts and/or notifications provided to the user for services and/or experiences can be centralized in a marketplace. For example, embodiments of the present disclosure can provide a marketplace where all of the services and/or experiences provided to the user in an alert or notification can be accessed via a marketplace in the application so that the information can be provided to the user. For example, in the example where a user responds in the affirmative to an alert or notification provided regarding requesting a ride share as transportation to the airport, the ride share application may be accessed in the marketplace. Further, embodiments of the present disclosure can be incorporated with the automated budgeting and expense reporting methods and systems, as described U.S. application Ser. No. 15/691,662, filed on Aug. 30, 2017. Accordingly, upon receipt of an affirmative response to an alert or notification, a further alert or notification can be provided to the user prompting whether a receipt of the transaction is available and should be provided in connection with the automated submission of expenses. Additionally, the budget can be updated automatically in view of the incurred expense.

Figure 3B:
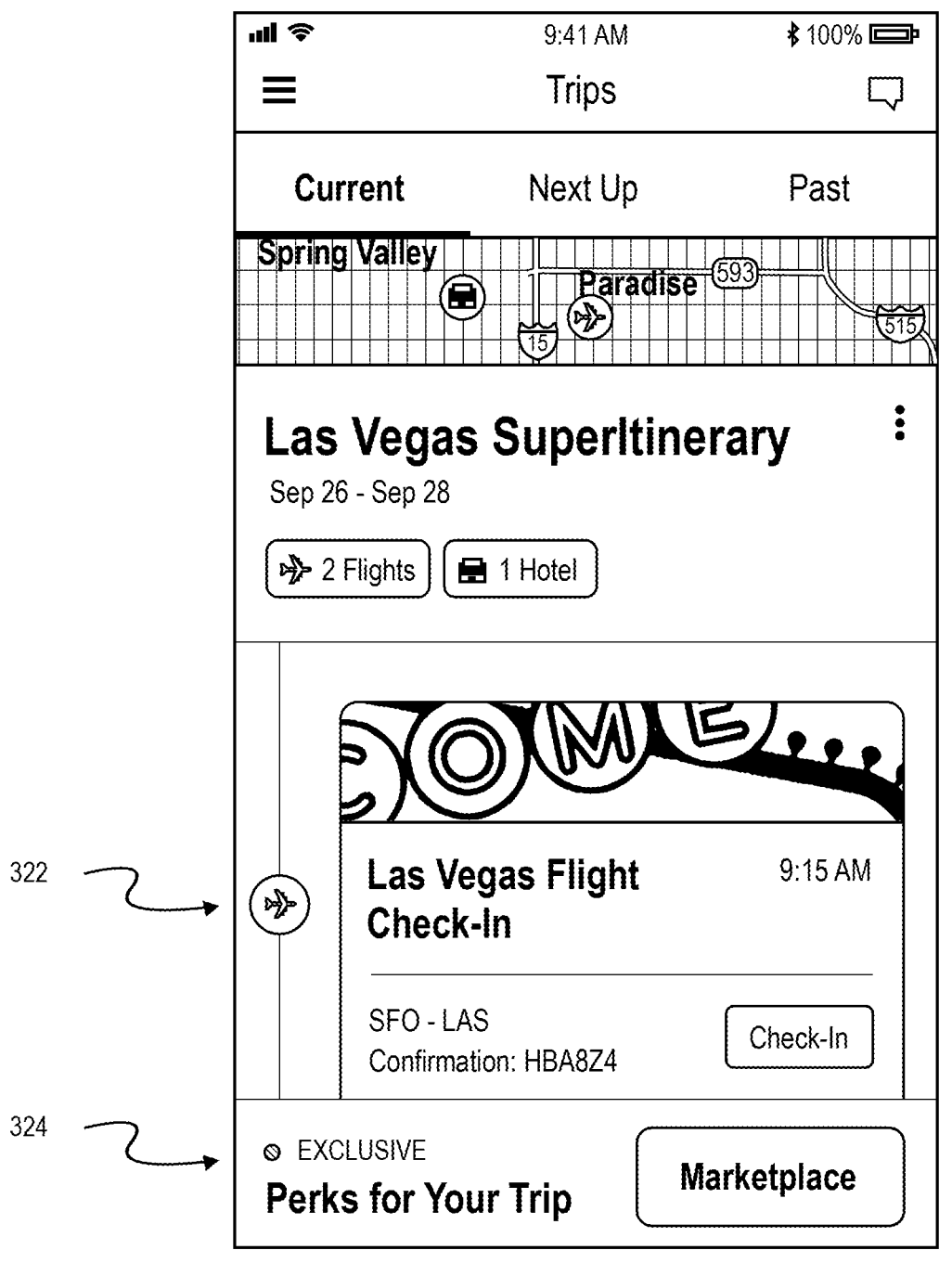

FIGS. 3A-3F show exemplary screenshots of a graphical user interface of an itinerary and alert/notification and marketplace, in accordance with embodiments of the present disclosure. As shown in FIG. 3A, the exemplary system can provide alerts/notifications 302, 304, and 306 in connection with the user's itinerary based on events used to construct the user's itinerary.

As shown in FIG. 3A, exemplary itinerary 300 can include a flight from MIA to JFK (301), a reservation at the Hotel (303), and a Team Dinner (305). Further, itinerary 300 can display each element, including certain parameters each associated with each element. For example, flight 301 can include the flight number, confirmation number, departure and arrival times, departure and destination, etc. Similarly, hotel reservation 303 can include the confirmation number, check-in/check-out times and/or dates, address, etc. Based on these elements, certain associated services may be identified. For example, transportation from JFK to the Hotel may be identified as one suggested or predicted service. Additionally, a Scooter ride may also be identified as a suggested associated service based on the block of free time from check in at the Hotel at 2:00 PM until the 6:00 PM dinner. Other services, experiences, events, etc. may also be identified in connection with the free block of time. Accordingly, after the suggested services have been identified, corresponding alerts and/or notifications may be generated in connection with the identified services. According to certain aspects of the present disclosure and as shown in FIGS. 3A-3E, the alerts or notifications may be embedded or integrated into the itinerary. For example, these alerts or notifications may have been created at the time the itinerary was created such that the itinerary was prepopulated with the alerts or notifications so that it may be integrated with the itinerary.

For example, alert 302 may be provided to the user to query whether to request a ride-share service such as a ride share from JFK to the Hotel. Additionally, alert 304 may be provided to the user to query whether to request a scooter share service, and alert 306 may be provided to the user to query whether to order food delivery.

FIG. 3B shows an exemplary screenshot 320 in accordance with another exemplary embodiment, where the alert and/or notification provided on the client device is requesting that the user check-in for a flight to Las Vegas. Similar to screenshot 300 shown in FIG. 3A, screenshot 320 can display certain elements of an itinerary. For example, flight element 322 can be displayed. Additionally, a link 324 to access to the marketplace may also be presented on the display.

Figure 3D:
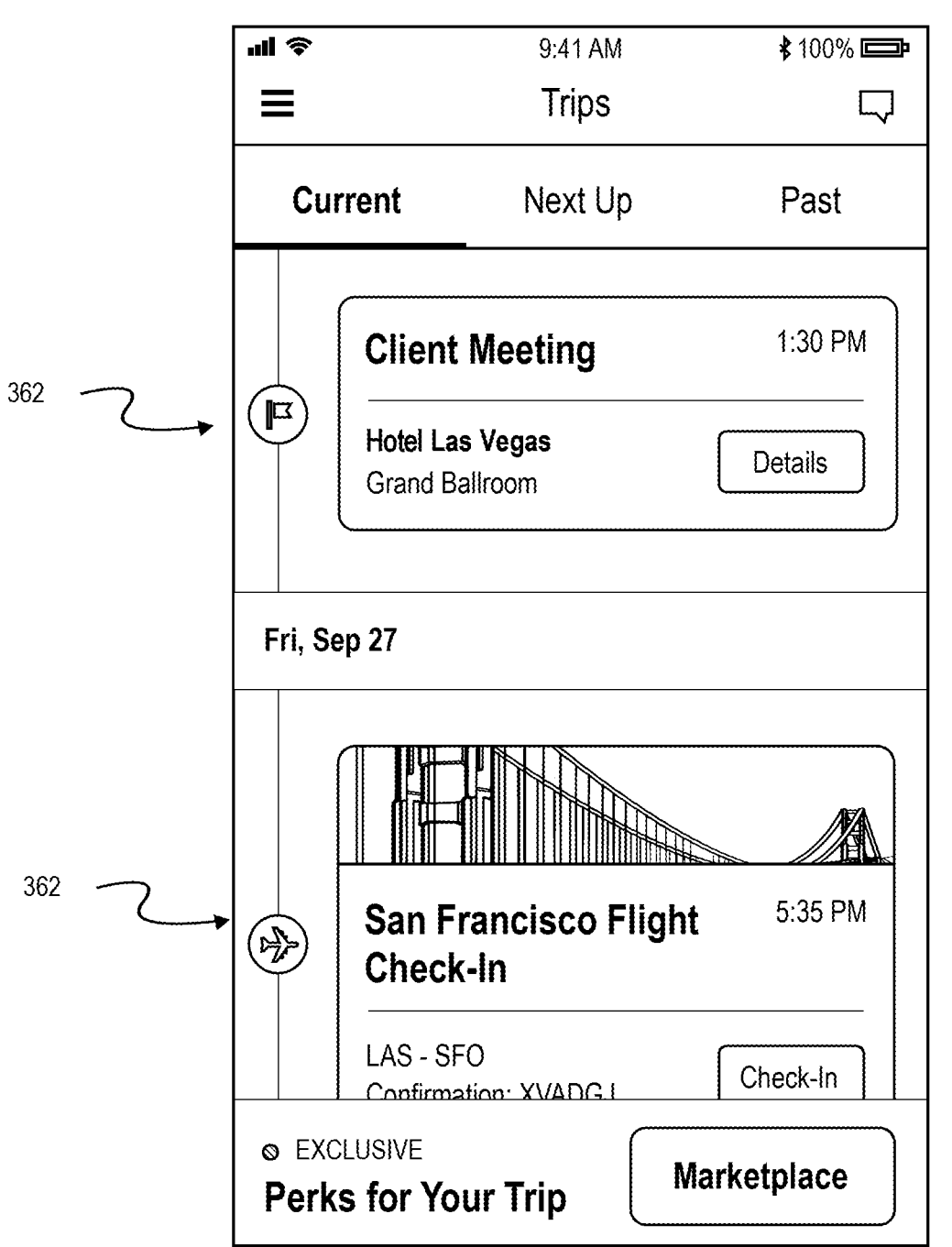
Figure 3E:
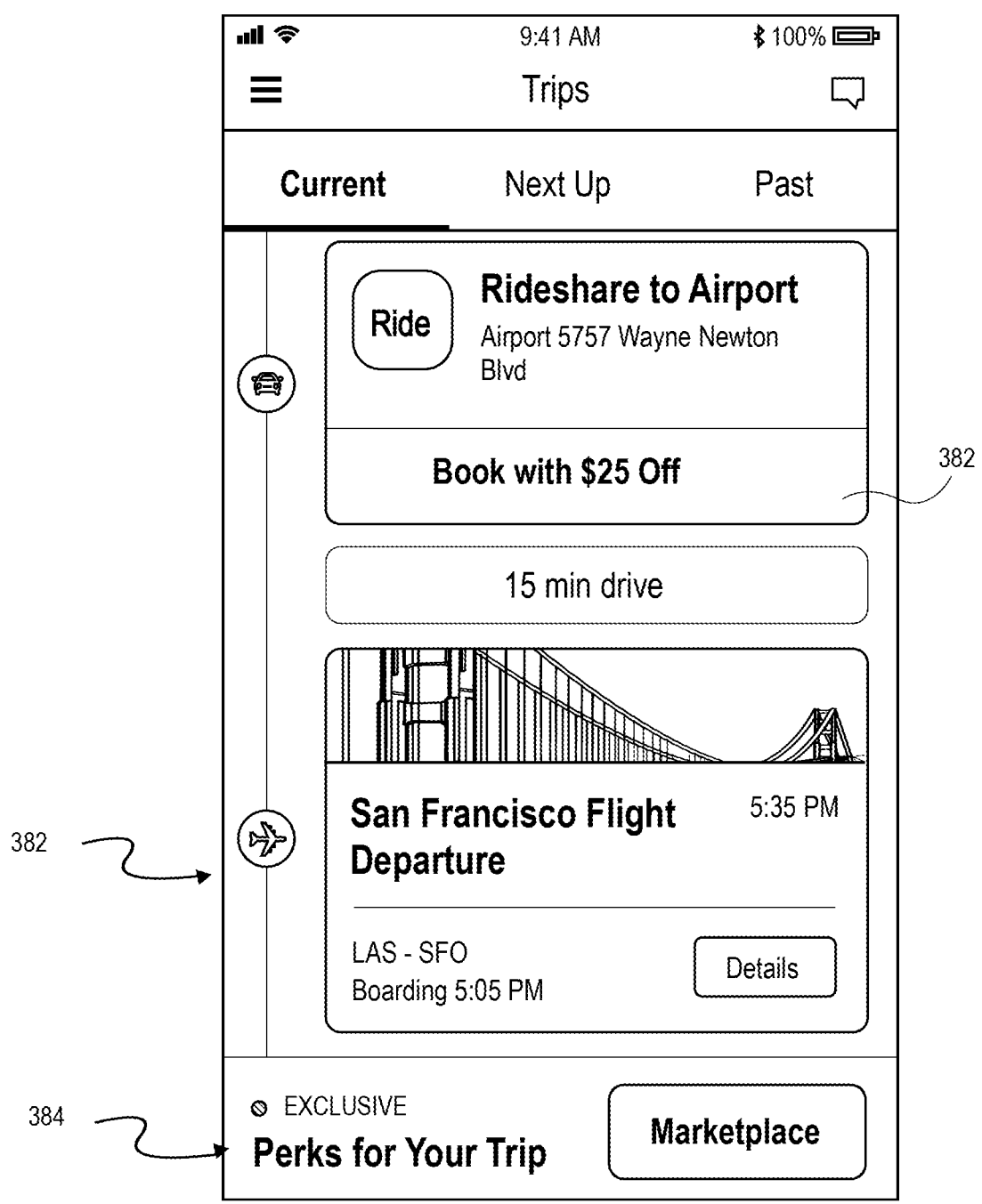

Similarly, FIG. 3C shows an exemplary screenshot 340, which may include alerts and/or notifications 342 in connection with booking of a rideshare to the hotel reservation that is indicated in the itinerary and checking in to the hotel (344). Other information can also be provided in connection with the alert or notification in connection with the ride share and the hotel reservation, such as, for example, estimated travel time, pick up time, check in time, departure time, confirmation number, or any other information associated with the service. FIGS. 3D and 3E show further exemplary screenshots 360 and 380, showing a client meeting (362) as part of the itinerary, a flight element (362), and an alert and/or notification 382 in connection with reserving a rideshare to the airport, along with a discount offer, and a flight element 382. Further, as shown in FIGS. 3A-3F the exemplary screenshots show that a user can also directly access the marketplace (e.g., 384 in FIG. 3E) to add further reservations, bookings, experiences, etc. to add to the itinerary.

Figure 3F:
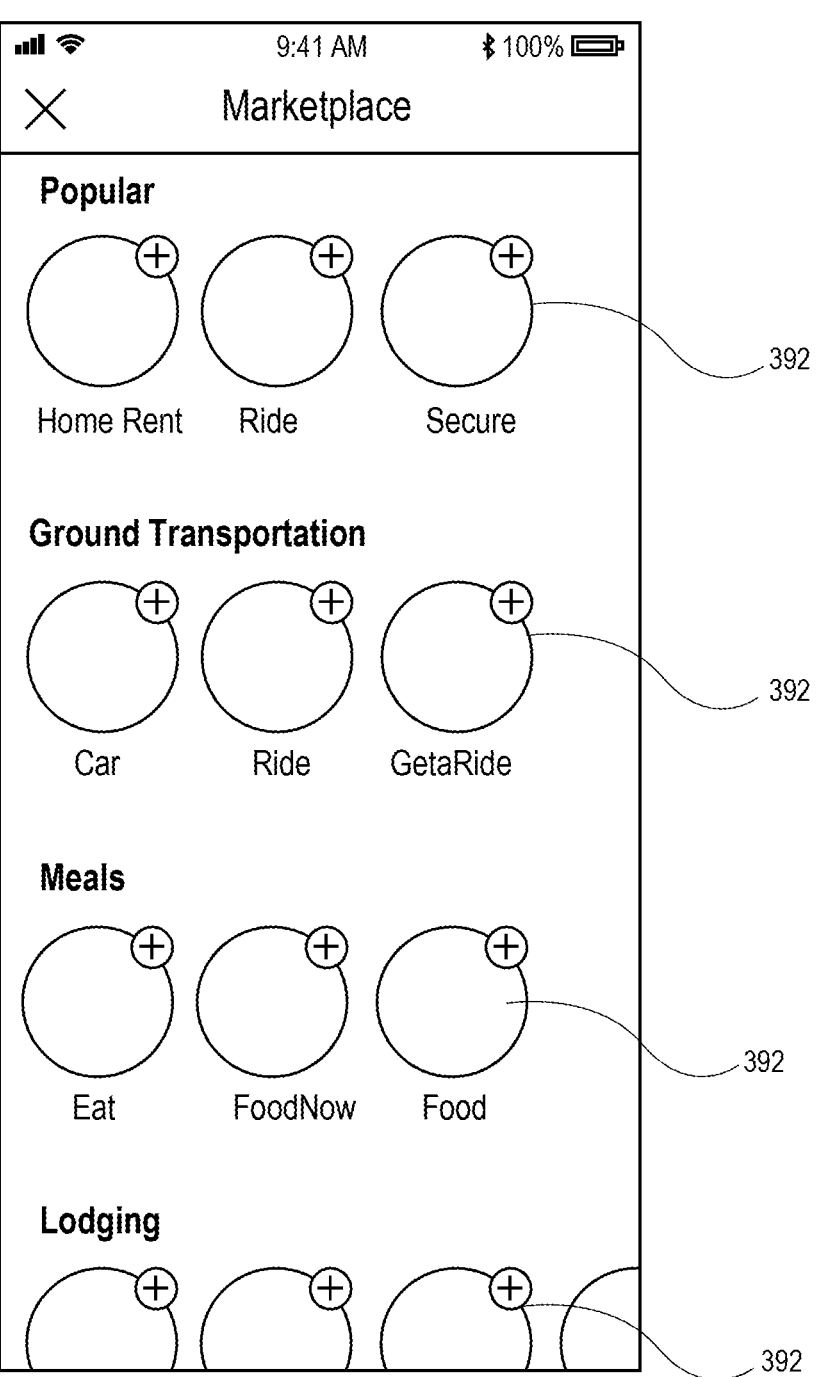

FIG. 3F, shows a screenshot of an exemplary marketplace 390. As shown in FIG. 3F, marketplace 390 can provide centralized access to a plurality of applications 392. For example, applications 392 may be grouped by category and marketplace 390 may also include filters to facilitate customization of the applications viewable and accessible on marketplace 392. Via marketplace 390, a user can access and launch any of the applications 392 presented on marketplace 390. Further, in the event that a user responds in the affirmative to an alert or notification, embodiments of the present disclosure may automatically launch marketplace 390 to enable the user to efficiently complete booking of the service presented in the alert or notification.

Figure 4:
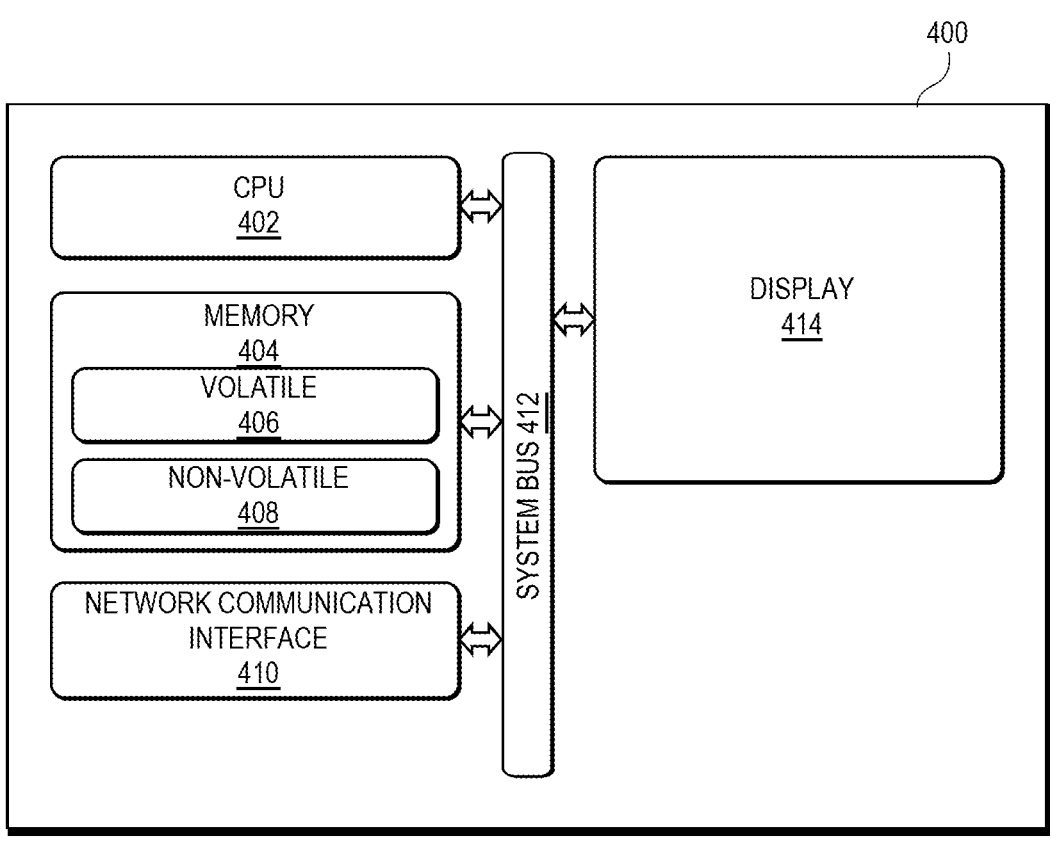
FIG. 4 is a block diagram of an exemplary computing system (or computing device) configured for implementing embodiments of the present disclosure.

FIG. 4 is a block diagram illustrating an exemplary computing system 400 (or computing device) suitably configured for implementing the described implementations. Computing system 400 typically can include one or more processors (or processing units), such as processor 402, and can further include at least one memory 404. Processor 402 and memory 404, as well as other components of the computing system, such as display 414, are interconnected by way of a system bus 412.

As will be appreciated by those skilled in the art, the memory 404 typically (but not always) includes both volatile memory 406 and non-volatile memory 408. Volatile memory 406 retains or stores information so long as the memory is supplied with power. In contrast, non-volatile memory 408 is capable of storing (or persisting) information even when a power supply is not available. Generally speaking, RAM and CPU cache memory are examples of volatile memory 406, whereas ROM, solid-state memory devices, memory storage devices, and/or memory cards are examples of non-volatile memory 408.

Figure 5:
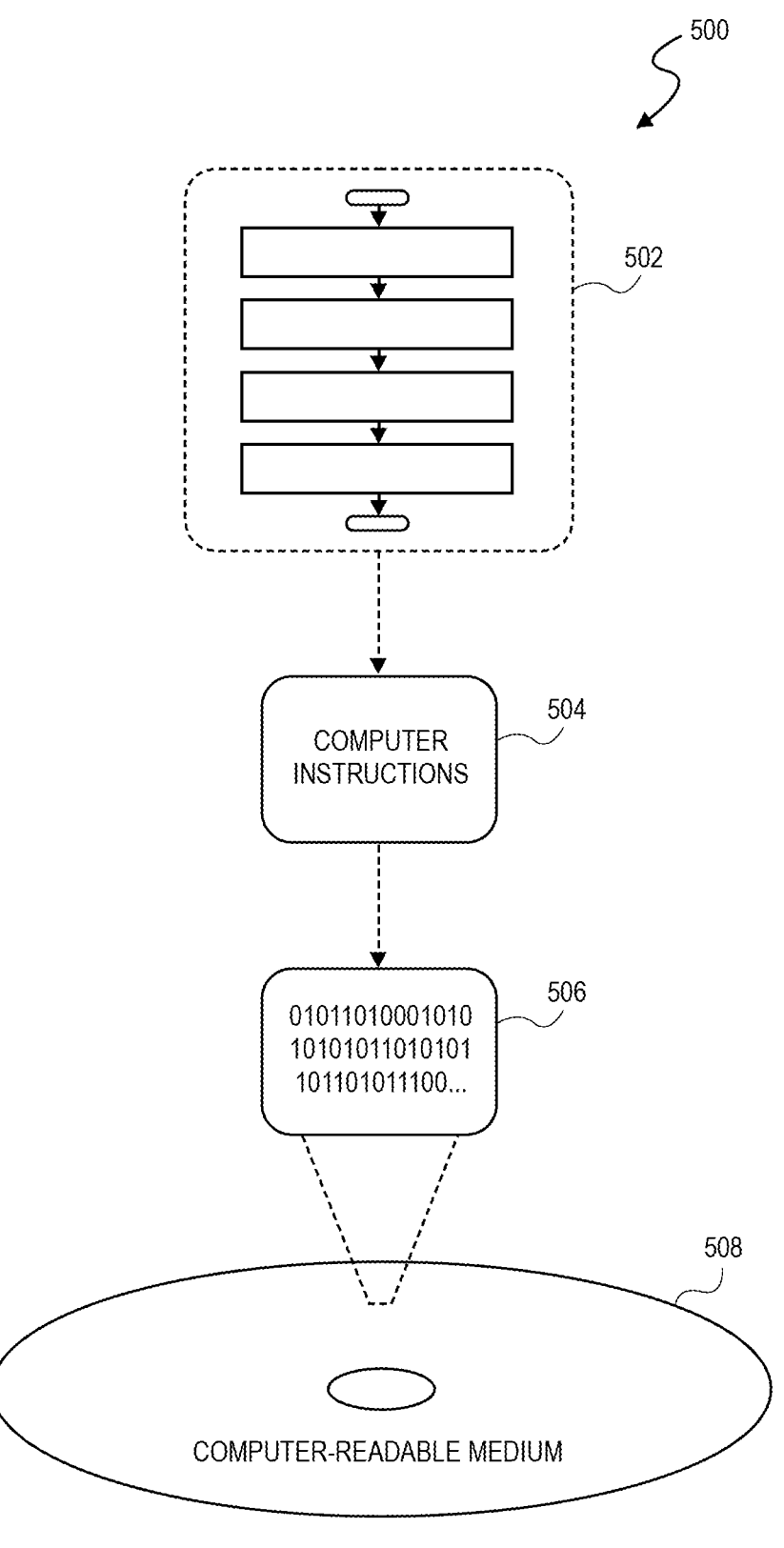
FIG. 5 is a block diagram illustrating an exemplary computer readable medium encoded with instructions, in accordance with embodiments of the present disclosure.

As will be further appreciated by those skilled in the art, processor 402 executes instructions retrieved from the memory 404, from computer readable media, such as computer readable media 508 of FIG. 5, and/or other executable components in carrying out the various described implementations. Processor 402 may be comprised of any of a number of available processors such as single processor, multi-processor, single-core units, and multi-core units, which are well known in the art.

Further still, the illustrated computing system 400 typically also includes a network communication interface 410 for interconnecting this computing system with other devices, computers and/or services over a computer network, such as networks 106 of FIG. 1. The network communication interface 410, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 410, is typically comprised of hardware and/or firmware components (and may also include or comprise executable software components) that transmit and receive digital and/or analog signals over a transmission medium (i.e., the network).

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 2, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Those skilled in the art will appreciate that, in some embodiments, the functionality provided by the methods, systems, and apparatus discussed above may be provided in alternative ways, such as being split among more software modules or routines or consolidated into fewer modules or routines, and/or being split into additional or fewer robotic or automated units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and nodes may be implemented in firmware or hardware.

Regarding computer readable media, FIG. 5 is a block diagram illustrating an exemplary computer readable medium 500 encoded with instructions, as described in regard to process 200 of FIG. 2. More particularly, the implementation can include a computer-readable medium 508 (e.g., a CD-R, DVD-R or a platter of a hard disk drive), on which is encoded computer-readable data 506. Computer-readable data 506 in turn can include a set of computer instructions 504 configured to operate according to one or more of the principles set forth herein. In one such implementation 502, processor-executable instructions 504 may be configured to perform a method, such as at least some of exemplary process 200, for example. In another such implementation, processor-executable instructions 504 may be configured to implement a system on a computing device, such as at least some of the exemplary, executable components of computing device 400 of FIG. 4, as described below. Many such computer readable media may be devised, by those of ordinary skill in the art, which are configured to operate in accordance with the implementations presented herein.

The embodiments and examples shown above are illustrative, and many variations can be introduced to them without departing from the spirit of the disclosure. For example, elements and/or features of different illustrative and exemplary embodiments herein may be combined with each other and/or substituted with each other within the scope of the disclosure. For a better understanding of the disclosure, reference should be had to any accompanying drawings and descriptive matter in which there are illustrated exemplary embodiments of the present invention.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 2, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method for providing an itinerary, comprising:

automatically generating a personalized message, alert, or notification in connection with an associated service that is associated with a specific itinerary element of a plurality of itinerary elements, wherein the generated personalized message, alert, or notification is associated with one or more possible actions associated with the associated service and is integrated into a presented itinerary, located adjacent to the specific itinerary element on the client device, and among the plurality of the itinerary elements, and wherein the presentation of the personalized message, alert, or notification is based at least in part on either or both of a location of the client device and a time relative to a scheduled time of the associated itinerary element;

receiving a response to the personalized message, alert, or notification that includes an indication of proceeding with the associated service; and based on the determination, causing at least one of the one or more possible actions associated with the associated service to be automatically initiated.

2. The method of claim 1, wherein the one or more possible actions include declining the associated service.

3. The method of claim 1, wherein the plurality of itinerary elements comprise at least one of:

a lodging reservation;

a transportation reservation;

a restaurant reservation;

a meeting scheduling; and a conference scheduling.

4. The method of claim 1, wherein the personalized message, alert, or notification is based at least in part on at least one of:

a profile associated with the user of the client device;

a plurality of preferences associated with the user of the client device; and historical behavior of the user of the client device.

5. The method of claim 1, wherein the personalized message, alert, or notification is related to at least one of:

a service type;

a service provider;

a transportation type;

a transportation provider;

a lodging type;

a lodging provider;

14 an attraction type;

a restaurant; and a cuisine type.

6. The method of claim 1, wherein causing at least one of the one or more possible actions associated with the associated service to be automatically initiated comprises providing access to the associated service through an application available via a marketplace providing centralized access to a plurality of applications.

7. The method of claim 1, further comprising:

obtaining a plurality of parameters associated with the plurality of itinerary elements;

generating the itinerary including the plurality of itinerary elements based at least in part on the plurality of parameters, wherein the plurality of parameters is obtained from at least one of:

an email;

an application associated with a travel itinerary element associated with at least one of the plurality of parameters; and a calendar entry.

8. The method of claim 1, wherein the plurality of itinerary elements includes a flight itinerary element, a drive itinerary element, a hotel itinerary element, and a meal itinerary element;

wherein the associated service is a first service of a plurality of services;

wherein the plurality of services include a ride service facilitating the drive itinerary element and a food service facilitating the meal itinerary element;

wherein the personalized message, alert, or notification is a first alert of a plurality of alerts;

wherein the plurality of alerts include a request ride alert associated with the ride service and an order meal alert associated with the meal itinerary element; and wherein the flight itinerary element, the drive itinerary element, the hotel itinerary element, the meal itinerary element, the request ride alert, and the order meal alert are simultaneously provided for presentation on the display of the client device.

9. The method of claim 1, wherein the associated service is a first service and the personalized message, alert, or notification is a first message, alert, or notification;

wherein the method further comprises:

identifying an omission in the itinerary;

identifying a second service associated with the omission; and causing the client device to present a second message, alert, or notification for viewing by the user, wherein the second message, alert, or notification is integrated into the presented itinerary, located among the plurality of travel itinerary elements;

wherein the second message, alert, or notification is associated with the second service.

10. The method of claim 1, wherein the received response to the personalized message, alert, or notification includes excluding services that are incompatible with a corporate policy.

11. The method of claim 1, wherein the received response to the personalized message, alert, or notification occurs after receiving an indication that the user declined a previously associated service for the specific itinerary element.

12. A computing system, comprising:

a memory coupled to one or more processors and storing program instructions that, when executed by the one or more processors, cause the one or more processors to at least:

automatically generate a personalized message, alert, or notification in connection with an associated service that is associated with a specific itinerary element of a plurality of itinerary elements, wherein the generated personalized message, alert, or notification is associated with possible actions associated with the associated service and is integrated into a presented itinerary, located adjacent to the specific itinerary element on the client device among the plurality of itinerary elements, and wherein the presentation of the personalized message, alert, or notification is based at least in part on either or both of a location of the client device and a time relative to a scheduled time of the associated itinerary element;

receive a response to the personalized message, alert, or notification, wherein the response includes an indication of proceeding with the associated service; and based on the determination, causing at least one of the one or more possible actions associated with the associated service to be initiated.

13. The computing system of claim 12, wherein the one or more possible actions include declining the associated service.

14. The computing system of claim 12, wherein the plurality of itinerary elements comprise at least one of:

a lodging reservation;

a transportation reservation;

a restaurant reservation;

a meeting scheduling; and a conference scheduling; and wherein the personalized message, alert, or notification comprises at least one of:

a service type;

a service provider;

a transportation type;

a transportation provider;

a lodging type;

a lodging provider;

an attraction type;

a restaurant; and a cuisine type.

15. The computing system of claim 12, wherein the personalized message, alert, or notification is based at least in part on at least one of:

a profile associated with the user of the client device;

a plurality of preferences associated with the user of the client device; and historical behavior of the user of the client device.

16. The computing system of claim 12, wherein causing at least one of the one or more possible actions associated with the associated service to be automatically initiated comprises providing access to the associated service through an application available via a marketplace providing centralized access to a plurality of applications.

17. The computing system of claim 12, wherein the computing system comprises the client device; and wherein the client device comprises the memory.

18. The computing system of claim 12, wherein the computing system comprises a server; and wherein the server comprises the memory.

19. A system, comprising:

a memory storing a program;

one or more computer processors arranged to execute the program for performing a method comprising:

generating a personalized message, alert, or notification in connection with a service that is associated with a specific itinerary element of a plurality of itinerary elements, wherein the generated personalized notification, alert, or message comprises possible actions associated with the associated service;

causing a client device to present the personalized message, alert, or notification on the client device for viewing by a user, wherein the personalized message, alert, or notification is integrated into a presented itinerary, located adjacent to the specific travel itinerary element on the client device, and among the plurality of the travel itinerary elements, and wherein the presentation of the personalized message, alert, or notification is based at least in part on either or both of a location of the client device and a time relative to a scheduled time of the associated itinerary element;

receiving a response to the personalized message, alert, or notification, the response including an indication of proceeding with at least one of the possible actions associated with the associated service; and based on the determination, causing the at least one of the possible actions associated with the associated service to be initiated.

20. The system of claim 19, wherein the system comprises:

the client device, wherein the client device comprises the memory and the one or more computer processors.

* * * * *